United States Patent
Bronkhorst

(10) Patent No.: US 9,712,815 B2
(45) Date of Patent: Jul. 18, 2017

(54) METHOD OF ANTICIPATING COMPONENT FAILURE IN BROADBAND NETWORK DEVICES

(71) Applicant: Technetix B.V., Veenendaal (NL)

(72) Inventor: Gert Bronkhorst, Veenendaal (NL)

(73) Assignee: Technetix B.V., Veenendaal (NL)

( * ) Notice: Subject to any disclaimer, the term of this patent is extended or adjusted under 35 U.S.C. 154(b) by 0 days.

(21) Appl. No.: 15/064,702

(22) Filed: Mar. 9, 2016

(65) Prior Publication Data

US 2016/0269724 A1     Sep. 15, 2016

(30) Foreign Application Priority Data

Mar. 9, 2015    (GB) .................................. 1503917.5

(51) Int. Cl.
*H04N 17/00*    (2006.01)
(52) U.S. Cl.
CPC ................................. *H04N 17/004* (2013.01)
(58) Field of Classification Search
CPC .................................................... H04N 17/004
See application file for complete search history.

(56) References Cited

U.S. PATENT DOCUMENTS

| | | | | |
|---|---|---|---|---|
| 2004/0261119 | A1* | 12/2004 | Williams | H04N 7/17309 725/129 |
| 2009/0072982 | A1 | 3/2009 | Cheng et al. | |
| 2013/0094262 | A1 | 4/2013 | Avrutsky | |
| 2014/0091783 | A1 | 4/2014 | Cotton et al. | |

FOREIGN PATENT DOCUMENTS

| | | |
|---|---|---|
| CN | 103308866 A | 9/2013 |
| DE | 102012208036 A1 | 11/2013 |

OTHER PUBLICATIONS

ESPACENET, English Machine Translation of Abstract for CN103308866A, dated Sep. 18, 2013, retrieved from http://worldwide.espacenet.com on Feb. 23, 2016 (2 pages).
ESPACENET, English Machine Translation of Abstract for DE102012208036A1, dated Nov. 14, 2013, retrieved from http://translationportal.epo.org on Feb. 23, 2016 (1 page).
United Kingdom Intellectual Property Office, Patents Act 1977: Search Report under Section 17, dated Aug. 3, 2015 (2 pages).

* cited by examiner

*Primary Examiner* — Michael Teitelbaum
(74) *Attorney, Agent, or Firm* — Wood Herron & Evans LLP

(57) ABSTRACT

There is provided a method of anticipating component failure in broadband network devices, the method comprising monitoring values of AC ripple voltage on a DC voltage from a power supply associated with a CATV amplifier or node, comparing values of AC ripple voltage with a set value to determine whether the value of AC ripple voltage are acceptable or not, generating an alarm when the set value is exceeded and sending the alarm to a remote computing device. The monitoring step further comprises amplifying the AC ripple voltage by a factor of 10 and passing the amplified signal to a processing means for comparison with the set value. A circuit for monitoring the ripple voltage is also provided.

6 Claims, 4 Drawing Sheets

METHOD OF ANTICIPATING COMPONENT FAILURE IN BROADBAND NETWORK DEVICES

CROSS-REFERENCE TO RELATED APPLICATIONS

The present application claims priority under 35 U.S.C. §119 of United Kingdom Patent Application No. 1503917.5, filed Mar. 9, 2015, the disclosure of which is hereby incorporated herein by reference in its entirety.

FIELD OF THE INVENTION

The present invention relates to a method of anticipating component failure in broadband network devices, in particular in amplifiers and nodes, and a related device associated with the method.

BACKGROUND OF THE INVENTION

Modern cable companies deliver high-quality digital video and audio to the customers. In some homes, a single incoming cable feed is connected to more than one television with use of a splitter. The more the incoming signal is split and rerouted, the more the overall speed and quality will suffer. The picture can become grainy and snowy, or blurry ghost-like images can appear.

To ensure the signal quality is sufficient, CATV cable amplifiers are used as outdoor active components to provide signal gain and boost the signal strength of the CATV signal. This results in a better quality of the television reception picture and improves the speed and reliability of the signal. CATV cable amplifiers are now generally used to supply analogue/digital cable television but also triple play services like Internet, Video on Demand and Telephony.

The amplifier only boosts the strength of the signal and should not add additional noise to the signal. The amplifier also minimizes the signal loss caused by a long distance between the outdoor amplifier and the wall outlet inside the costumer house. The amplifier can also improve equalization across the frequency range, and some outdoor amplifiers provide bi-directional signal gain. This is used to sent back information (data) to the cable company, for example, the return path is used for Internet and Video on Demand.

The outdoor CATV amplifier is located in an outdoor cabinet. Traditionally the amplifier is only accessible by sending a technician to the outdoor cabinet location to service the amplifier. However, more and more outdoor amplifiers are remotely configurable. Whilst this allows many aspects of configuration of the outdoor amplifier to be managed from a distance, for example, from a Head-End location controlled by the cable service provider, difficulties arise with the power supply integral to the amplifier. Such power supplies are designed with the use of electrolytic capacitors. These capacitors have a low "Mean Time Between Failures" (MTBF) compared to all other components used in the CATV amplifier. They are thus likely to fail sooner than any of the other components associated with the amplifier and its power supply. If any of the capacitors in the power supply fail, then the power supply fails, the outdoor amplifier will go down and therefore also the network connection and service to the subscriber. Most of the service requests on amplifiers are due to defective power supplies or defects caused by lightning.

SUMMARY OF THE INVENTION

In accordance with one aspect of the present invention, there is provided a method of anticipating component failure in broadband network devices, such as amplifiers and nodes, the method comprising:

(i) monitoring values of AC ripple voltage on a DC voltage from a power supply associated with a CATV amplifier or node;

(ii) comparing values of AC ripple voltage with a set value to determine whether the values of AC ripple voltage are acceptable or not;

(iii) generating an alarm when the set value is exceeded; and (iv) sending the alarm to a remote computing device.

By monitoring the value of the AC ripple voltage, increases in the ripple voltage over time indicating an impending failure of components such as capacitors within the power supply can be detected without need to physically examine equipment near a customer location. Once the AC ripple voltage exceeds a set level which is acceptable for device performance, sending an alarm signal to a remote computing device ensures maintenance and replacement of components can take place before components fail. Generation of this service alarm avoids signal interruption to a customer from failure of components and ensures that component failure can be anticipated before a customer complains about network problems.

To improve accuracy of monitoring, the monitoring may further comprise amplifying the AC ripple voltage preferably by a factor of 10 and passing the amplified voltage signal to a processing means, such as a microprocessor, analogue to digital convertor, microcontroller, programmable logic chip or the like for comparison with the set value. By undergoing amplification and subsequent conversion to a digital signal, accuracy of detection of critical changes in the AC ripple voltage is improved.

The method may further comprise repeating the comparison step to verify whether the set value has been exceeded before generating the alarm. This improves accuracy of alarm generation and avoids false alarms as whenever the set value is exceeded, the value of AC ripple voltage is checked at least once more, and typically checked a plurality of times, before the alarm is triggered.

The alarm can be sent automatically to the remote computing device by using an SNMP trap or similar, or the alarm may be sent in response to a request from the remote computing device. Thus, when a device has been installed for a sufficient time that component failure is thought likely to occur, for example, after a year of installation, the remote computing device may communicate with the device, for example, by periodic polling of the processing means, so as to identify whether an alarm has been generated. There are often some months between generation of an alarm and actual component failure and so no disadvantage accrues from intermittent polling. Once the component has been replaced, monitoring can be deactivated for an appropriate period of time.

A set value representing an acceptable AC ripple voltage may be recorded in a processing means such as a microprocessor, the monitored values of AC ripple voltage compared with the set value and an alarm generated when a monitored value exceeds the set or threshold value.

The method may further comprise communicating the alarm to a remote computing device using an existing CATV communication path, which may be done, for example, by using Docsis 3.x as a two-way communication platform.

The present invention also lies in a detection means or device comprising a monitoring means, such as an electrical circuit, to monitor the value of an output AC ripple voltage on a DC power supply associated with a CATV amplifier or node, an alarm means to generate a service alarm depending on the monitored value of the AC ripple voltage and communication means for communicating remotely with a computing device used to monitor generation of service alarms.

Preferably, the detection device further comprises amplification means to amplify the value of the AC ripple voltage and processing means, such as a microprocessor or analogue to digital convertor, to convert the amplified signal into a digital signal and to compare the digital signal with a set value or threshold value at which functioning of the device is acceptable.

The alarm is preferably generated as an electrical or data signal configured to be conveyed along an existing broadband communication structure.

BRIEF DESCRIPTION OF THE DRAWINGS

The present invention will now be described, by way of example, with reference to the accompanying drawings in which.

DETAILED DESCRIPTION OF THE INVENTION

Figure 1:
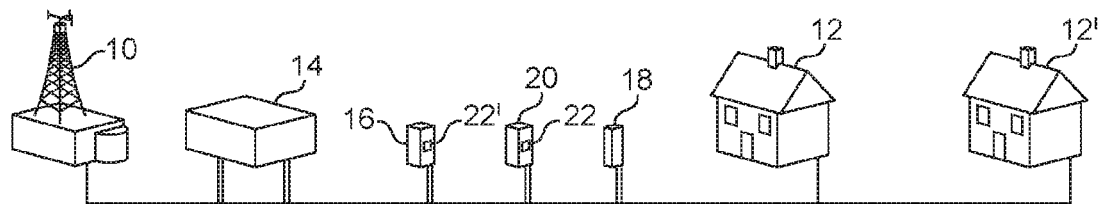
FIG. 1 is a schematic diagram illustrating external location of amplifiers in a CATV network.

In a CATV network for cable television and broadband communication, a headend 10 as shown in FIG. 1 transmits signals to and receives signals from customers in residential buildings 12, 12'. Whilst many different specific arrangements can be used for bi-directional transfer of signals between the provider and customer, the original signal is split many times to supply a plurality of users, typically by using a hub site 14, node site 16 with integral power supply 22', and distribution point 18. To ensure signal quality is maintained, external amplifiers are used along the cable routes, see, for example, amplifier 20 with integral power supply 22.

Outdoor amplifiers have an integral power supply typically using electrolytic capacitors. These capacitors have a low "mean time between failures" (MTBF) compared to all other components used in the CATV amplifier and in the internal power supply. Most failures of amplifiers are caused by defects resulting from lightning strikes or due to failure of the capacitors within the power supply.

Figure 2:
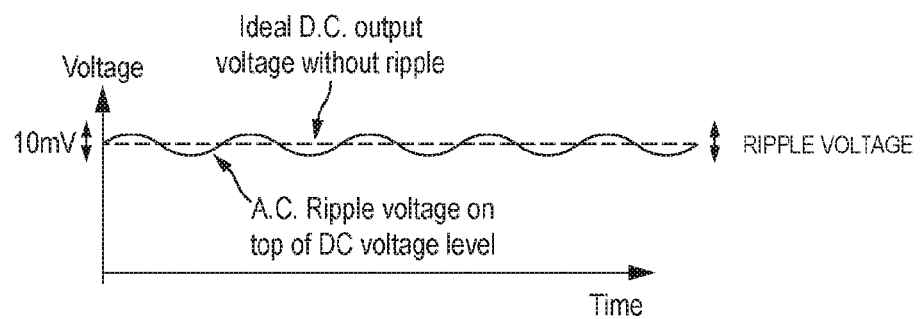
FIG. 2 illustrates ripple voltage on a power supply.

A ripple voltage is always present, even in a correct working power supply, but the AC ripple is low. FIG. 2 illustrates the ripple voltage of an integral power supply such as used to power node site 16 or amplifier 20 when working effectively. A small ripple voltage of around 10 mV is seen on the DC output. As capacitors in the power supply age, the ripple increases over time until the ripple level ceases to be acceptable and causes a complete power supply failure or causes problems in the power so such that the device, such as the amplifier, being driven by this power supply ceases to work correctly. Once the power supply fails, then the customer signal is interrupted. It is of advantage to anticipate failure of the power supply so that maintenance can be undertaken before power failure occurs. The present invention achieves this by monitoring the AC ripple voltage on the DC voltage supply of the integral power supply.

A peak detector is used to monitor the AC ripple voltage of integral power supply 22. If the ripple voltage exceeds an acceptable level, an alarm is triggered and communicated to the cable network provider so that maintenance can be scheduled before failure occurs.

The normal ripple voltage will depend on the power supply used and the associated current but for outdoor amplifier power supplies, a ripple voltage of below 10 mV will be acceptable and once the ripple voltage extends beyond an acceptable range for a specific power supply, an alarm will be triggered.

Figure 3:
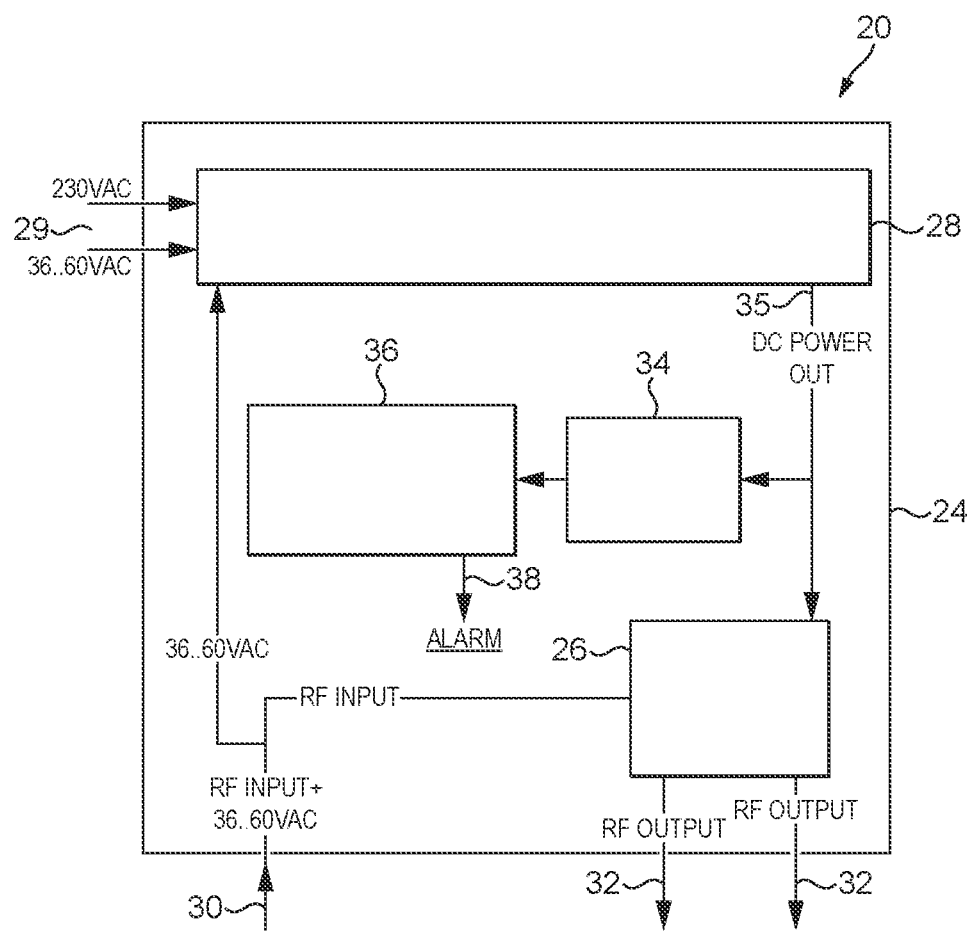
FIG. 3 is a schematic diagram of a device used in the present.

An amplifier 20 using the present invention is shown schematically in FIG. 3. Amplifier housing 24 contains amplifier circuitry 26 powered by a power supply 28 powered by external input 29, which can be achieved using an external connection or a coaxial cable with appropriate A.C. voltage. Signals requiring amplification are fed in through r.f. input port 30 and amplified r.f. signals leave output ports 32 for onward transmission. In accordance with the present invention, ripple detector circuit 34 is connected to DC power output 35 of power supply 28 to detect AC ripple voltage. Microprocessor 36 monitors and assesses the measurements of circuit 34 and, if appropriate, generates an alarm 38. Audio or visual alarms can be generated, although typically an alarm will be sent by Ethernet or Docsis 3.x using microprocessor 36 to generate an alarm message.

Circuit 34 monitors the ripple voltage at all times and amplifies the ripple voltage, typically by a factor of 10. The output analogue voltage of circuit 34 is converted to a digital voltage or ADC voltage by an analogue to digital converter associated with microprocessor 36. A set value for an allowed voltage ripple is stored in the digital core of microprocessor 36, based on a window method. The ADC voltage value is assessed by microprocessor 36 to determine whether the ADC voltage value falls within allowed parameters or not. If the ADC value exceeds the set value for a number of successive measurements, then an alarm signal is generated indicating the amplifier needs a service in a short period of time. Thus, where the output voltage of the analogue circuit 34 is higher than a programmed level in microprocessor 36, microprocessor 36 generates an alarm message.

Figure 4:
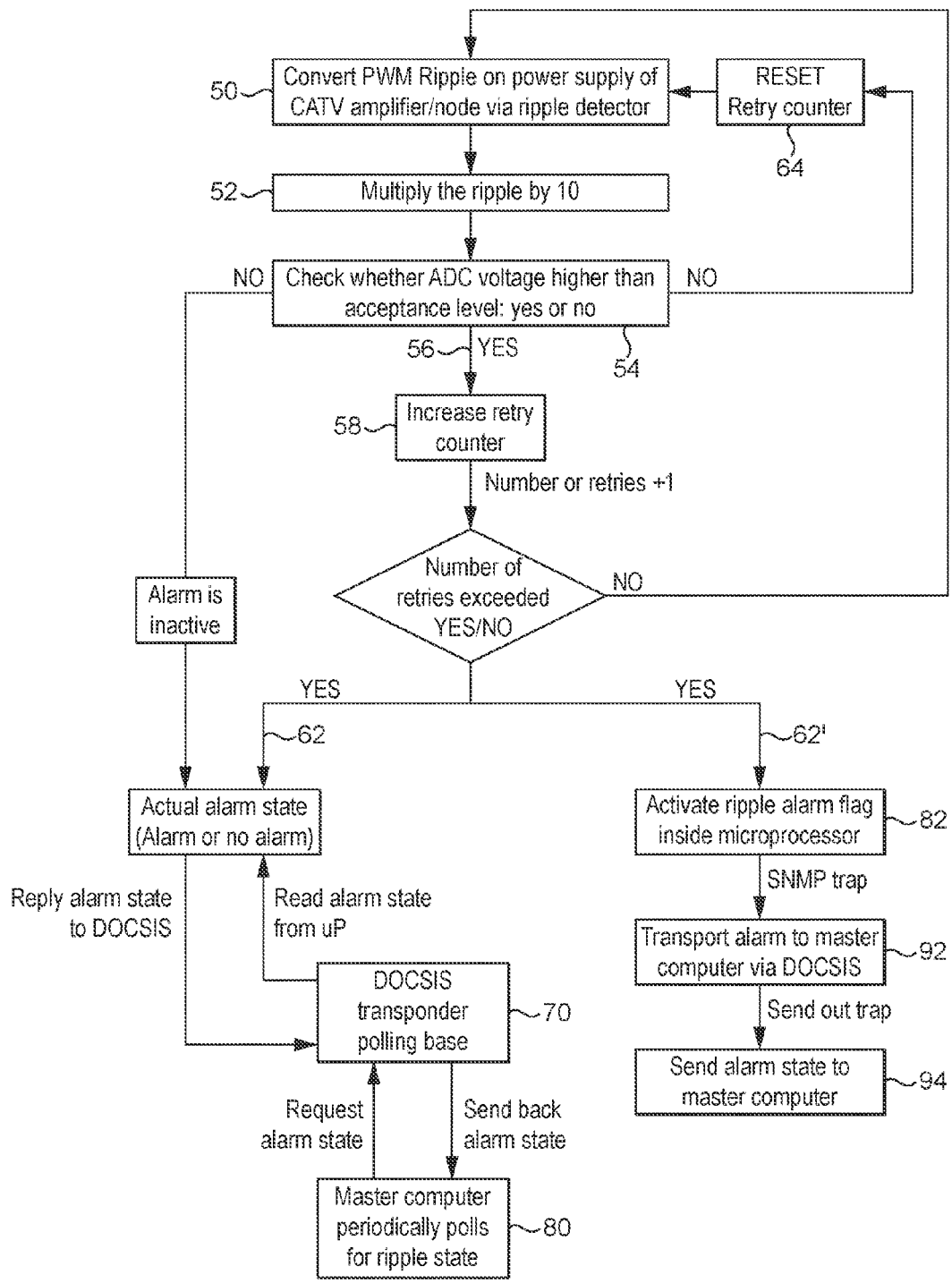
FIG. 4 is a flow diagram of an embodiment of a method in accordance with the present invention.

The detailed method for monitoring the ripple voltage and generating an alarm signal to a remote computer server is shown as a flow diagram in FIG. 4.

At 50, the ripple voltage is measured by converting the AC ripple voltage on the DC power supply of the CATV amplifier/node using a ripple detector or peak detector.

The ripple voltage is multiplied by a factor of 10, see 52, so as to produce an enhanced voltage for further investigation and passed to microprocessor 36 to generate an ADC voltage for comparison with a set value or acceptance level.

At 54, the ADC voltage is assessed by microprocessor 36 to see whether it is higher than a predetermined acceptance level or set level.

As long as the ADC voltage remains below the acceptance level, the alarm is not generated and remains active.

If the ADC voltage is higher than set level, then decision path 56 is followed and the ADC voltage checked for a number of repeat measurements, the number of which is specified by a retry counter which is incrementally increased, see 58, as each repeat measurement takes place. If a number of successive repeat measurements all generate a value that is higher than the acceptance level, then either path 62 or path 62' is followed and an alarm generated.

If at any point the acceptance level is detected as not being exceeded, see box 54, then the retry counter is reset to zero, see box 64.

By amplifying or multiplying the ripple voltage by a factor of 10 before obtaining an ADC voltage, the accuracy of detecting whether the acceptance level is within an acceptable limit or not is improved. By ensuring that a number of repeat readings must also exceed the acceptance level, it can be ensured that no false alarms are triggered.

FIG. 4 shows two options for the alarm signal, either using periodic polling along path 62 or automatic notification of an alarm along path 62'. Path 62 generates an alarm which can be transmitted along a two-way communication path via a Docsis transponder polling base 70 to a master computer 80. With this option, the master computer periodically polls the amplifier or node to investigate the alarm state. The alarm is only noted in response to a polling request.

Where path 62 is chosen and an intermittent polling-based monitoring system selected, generally every amplifier or node is checked within a set period of time, with every amplifier or node only sending an alarm to the master computer when requested to do so by the master computer. For this option, the alarm is not automatically sent to the computer.

Path 62" represents a one-way communication option where detecting that the set level has been exceeded for a number of measurement retries causes an alarm flag to be activated inside microprocessor 36. Using a messaging protocol, such as an SNMP trap, the alarm is communicated to a remote server or computing device 94 for the cable network provider to note and take further action on. For path 62", the alarm is received by the remote computer directly after the alarm is generated.

The method uses the infrastructure of the network itself to communicate an alarm with a remote server. Docsis 3.x can be used to allow transportation of data signals through the network to CATV equipment in a two-way direction.

By monitoring and measuring the ripple voltage, assessing how it compares to an acceptable ripple voltage and generating an alarm signal where the ripple voltage is consistently in excess of an acceptable ripple voltage, the present invention provides a way of remotely monitoring a value which helps indicate any failure of the amplifier or node power supply, and in particular capacitors within the power supply.

The method allows expected failure of components to be detected before any reduction in signal quality or signal interruption by consumers. Engineers are able to replace or repair amplifiers or nodes as soon as they receive notification that the ripple voltage has exceeded the accepted ripple level for that particular device. This provides advance warning to inform the CATV provider that the power supply associated with an amplifier or node is likely to cause problems soon.

Figure 5:
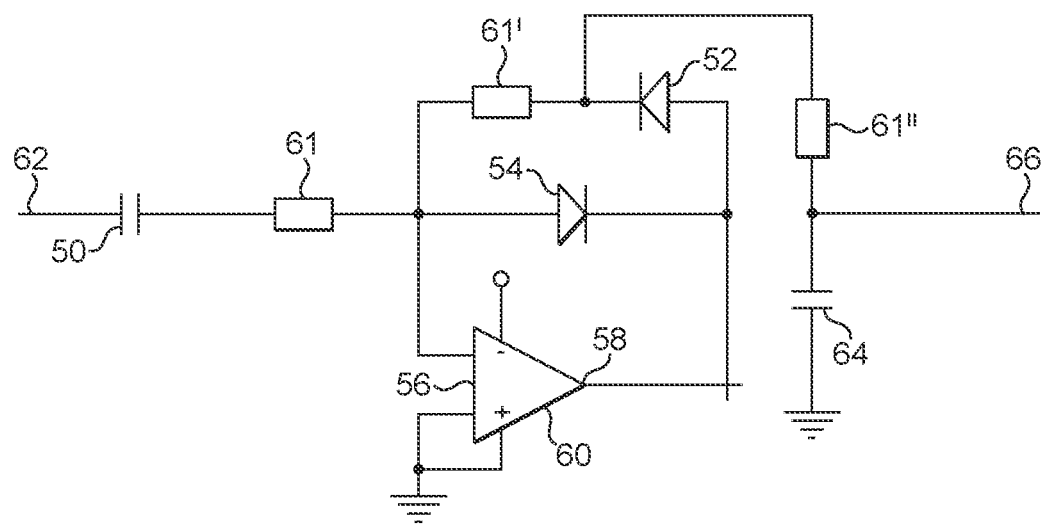
FIG. 5 is a circuit for use in accordance with the present invention.
Figure 6:
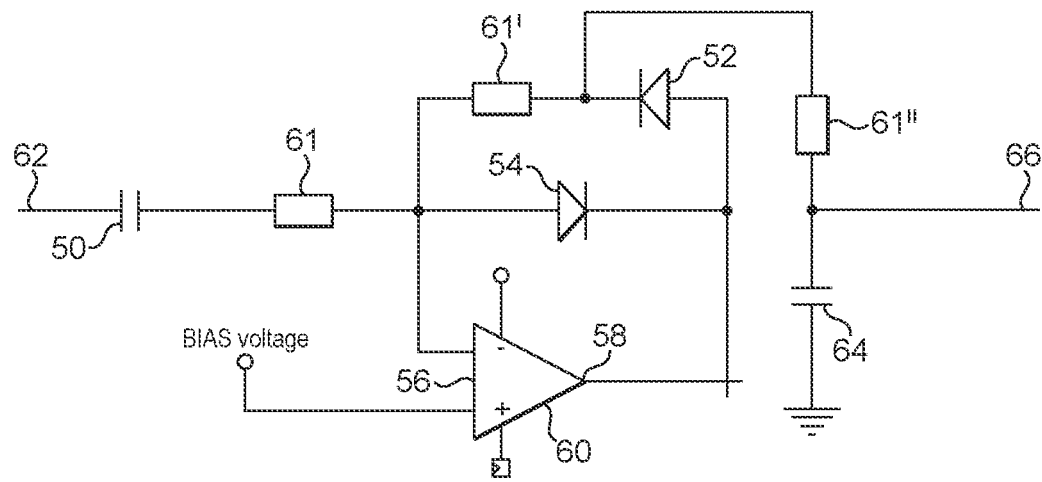
FIG. 6 is an alternative circuit to that shown in FIG. 5.

Examples of circuits used in detecting and monitoring the ripple voltage are shown in FIGS. 5 and 6, with the circuit shown in FIG. 5 being used where power is provided on a positive power and negative ground line and the circuit in FIG. 6 used where only a positive voltage is used. Where only a positive voltage is used, the output voltage is biased on the voltage provided on the positive side of the operational amplifier.

In FIG. 5, capacitor 50 is used to create a capacitive input with the circuit being an amplifying circuit to amplify the ripple voltage by at least a factor of 10. Diodes 52, 54 connected between an input 56 and output 58 of operational amplifier 60 create an ideal rectifier with resistors 61, 61', 61" used to modify the electrical characteristics of the overall circuit. The input ripple at input 62 quickly charges output capacitor 64 and gives an analogue voltage at output 66 which is digitally processed by an analogue to digital conversion circuit, typically within microprocessor 36. The digital voltage is assessed by microprocessor 34 relative to acceptable voltage values and where the value of the digital voltage is greater than allowed by microprocessor 36, an alarm is generated.

By incorporating power supply ripple detection, degradation of the power signal can be remotely monitored and detected, allowing scheduled replacement of components such as capacitors whilst the power supply is still working and before failure occurs. The ripple measurement has no impact on the amplified signal to the consumer.

While the present invention has been illustrated by description of various embodiments and while those embodiments have been described in considerable detail, it is not the intention of Applicant to restrict or in any way limit the scope of the appended claims to such details. Additional advantages and modifications will readily appear to those skilled in the art. The present invention in its broader aspects is therefore not limited to the specific details and illustrative examples shown and described. Accordingly, departures may be made from such details without departing from the spirit or scope of Applicant's invention.

What is claimed is:

1. A method of anticipating component failure in broadband network devices, the method comprising:
   (i) monitoring values of AC ripple voltage on a DC voltage from an integral power supply of a CATV amplifier or node;
   (ii) amplifying the AC ripple voltage and converting to a digital voltage;
   (iii) comparing values of the digital voltage with a set value for a number of successive measurements to determine whether the digital voltage exceeds the set value for a number of successive measurements;
   (iv) generating an alarm when the set value is exceeded for a number of successive measurements; and
   (v) sending the alarm to a remote computing device.

2. A method according to claim 1, wherein the monitoring step further comprises amplifying the AC ripple voltage by a factor of 10.

3. A method according to claim 1, wherein the alarm is sent automatically.

4. A method according to claim 1, further comprising sending the alarm in response to a request from the remote computing device.

5. A method according to claim 1, wherein the set value is recorded in a processing device.

6. A method according to claim 1, further comprising communicating the alarm to a remote computing device using an existing CATV communication path.

* * * * *